Figure 1:
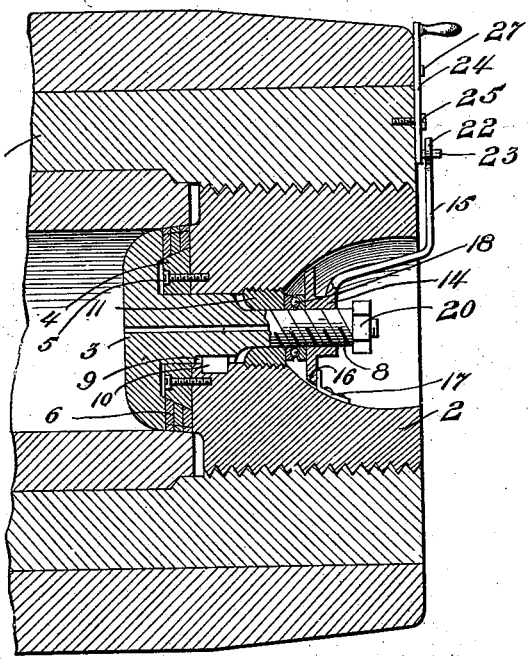

W. D. SMITH.
GUN.
APPLICATION FILED MAY 11, 1906.

983,781.

Patented Feb. 7, 1911.
5 SHEETS—SHEET 1.

Witnesses
B. M. Offutt
W. H. Crichton-Clarke

Inventor
William D. Smith
By Bakewell & Byrnes
Attorneys

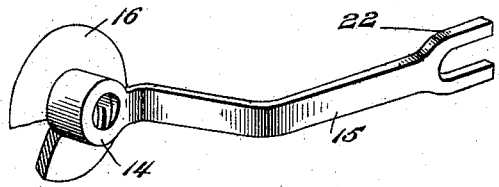
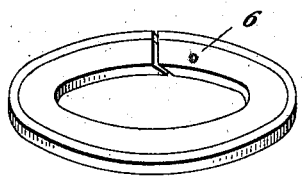
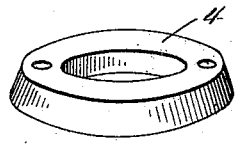
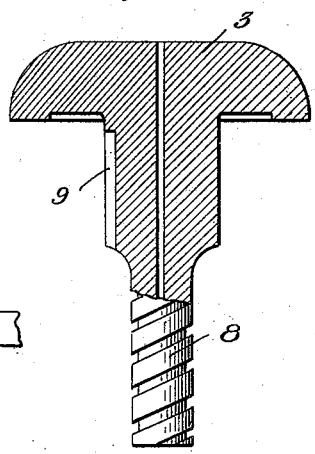
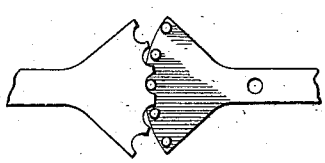

W. D. SMITH.
GUN.
APPLICATION FILED MAY 11, 1906.

983,781.

Patented Feb. 7, 1911.
5 SHEETS—SHEET 3.

Witnesses
O. M. Offutt
W. H. Crichton Clarke

Inventor
William D. Smith
Bakewell & Byrnes
Attorneys

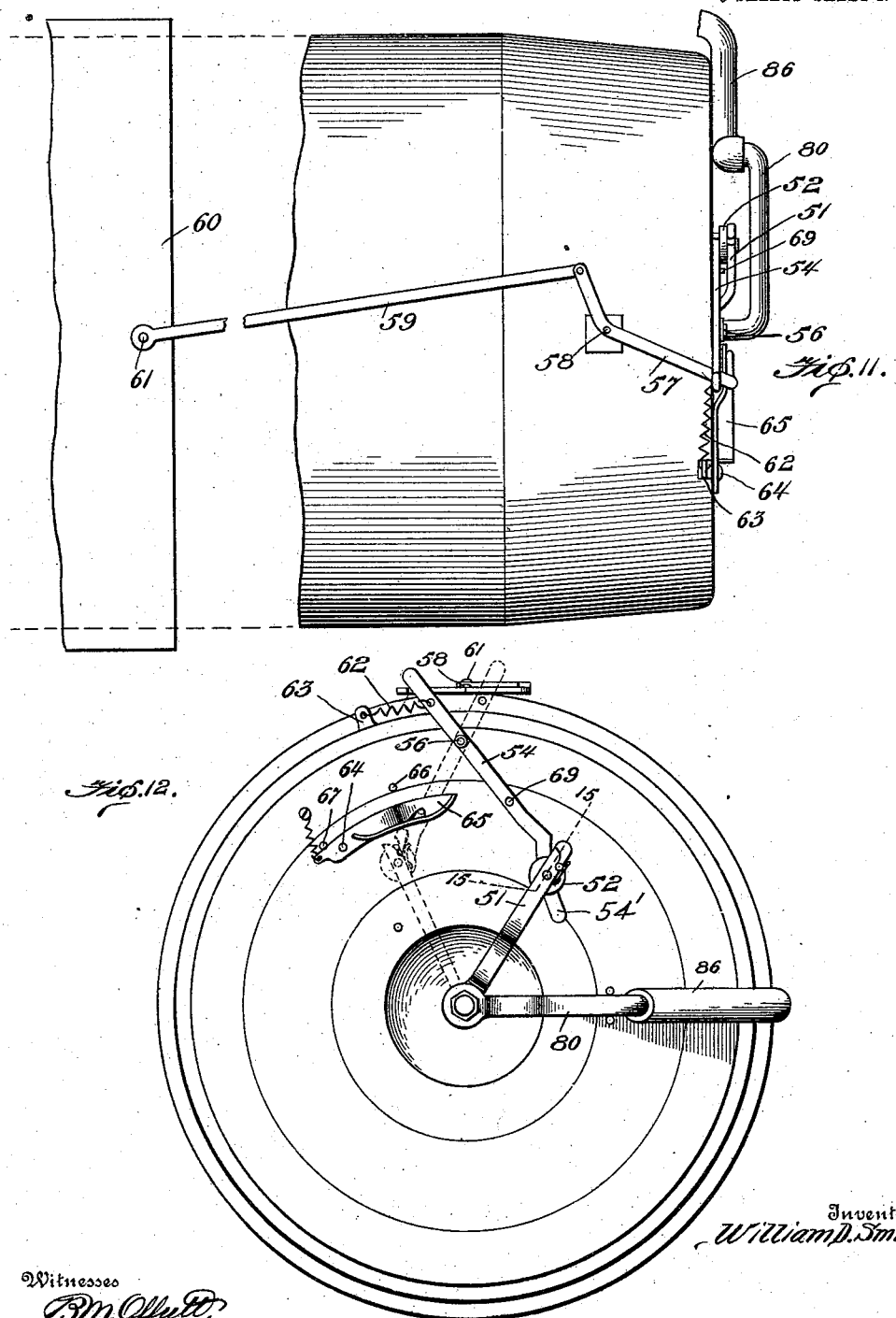

W. D. SMITH.
GUN.
APPLICATION FILED MAY 11, 1906.
983,781.
Patented Feb. 7, 1911.
5 SHEETS—SHEET 5.
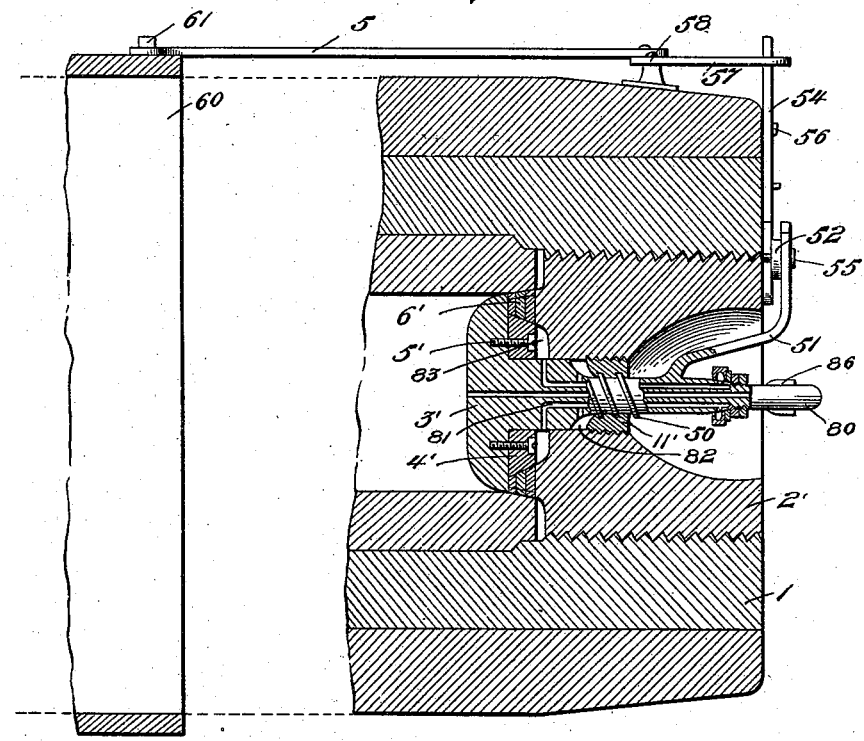
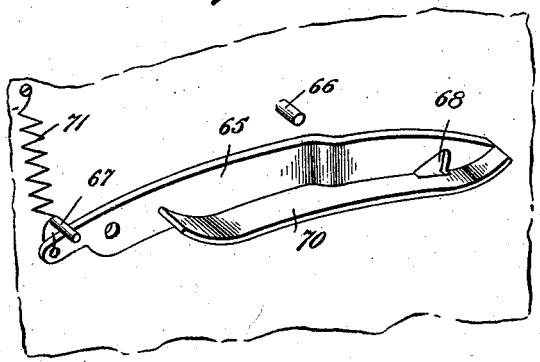
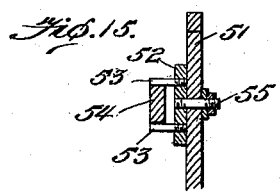
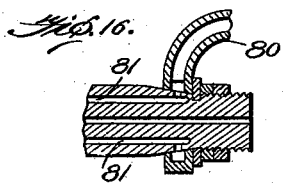
Inventor
William D. Smith
Witnesses
B. M. Offutt
W. H. Crichton-Clarke
By Bakewell & Byrnes
Attorneys

UNITED STATES PATENT OFFICE.

WILLIAM D. SMITH, OF DENVER, COLORADO, ASSIGNOR TO AUTOMATIC FLAREBACK PREVENTION COMPANY, OF PITTSBURG, PENNSYLVANIA, A CORPORATION OF PENNSYLVANIA.

GUN.

983,781.  Specification of Letters Patent.  Patented Feb. 7, 1911.

Application filed May 11, 1906. Serial No. 316,357.

*To all whom it may concern:*

Be it known that I, WILLIAM D. SMITH, a citizen of the United States, residing at Denver, in the county of Denver and State of Colorado, have invented certain new and useful Improvements in Guns, of which the following is a specification.

This invention relates to guns.

In constructing breech-loading ordnance, it is customary to provide the breech block with some form of gas check to prevent the escape of gases at the rear end of the gun.

One form of gas check, adapted to be expanded or "set," by the recoil resulting from the discharge of the gun, has been heretofore devised, but this form of gas check is objectionable by reason of the fact that it sometimes fails to operate and consequently permits the escape of gases around the breech block.

In my United States patent application, Serial Number 281,929, filed October 9, 1905, I have described and claimed a form of gas check which is adapted to be manually set prior to the discharge of the gun and which, by reason of its positive action, possesses advantages over the form of gas check which is designed to be set by the recoil caused by the discharge. In breech-loading ordnance, however, it is desirable that the gas check shall be automatically set prior to the discharge, so that it will be neither dependent upon the recoil nor upon the memory or attention of the gunner in manually setting the same prior to the discharge.

The principal object of the present invention is to provide means for automatically setting the gas check before the discharge of the gun.

A further object of the invention is to provide an improved form of gas check.

With the foregoing and other objects in view, which will appear as the description proceeds, the invention resides in the broad combination and arrangement of parts hereinafter described and claimed, it being understood that I do not desire to be limited to the particular construction illustrated and described, as many changes in the arrangement of parts and in the details of construction may be made within the scope of my invention.

Figure 2:
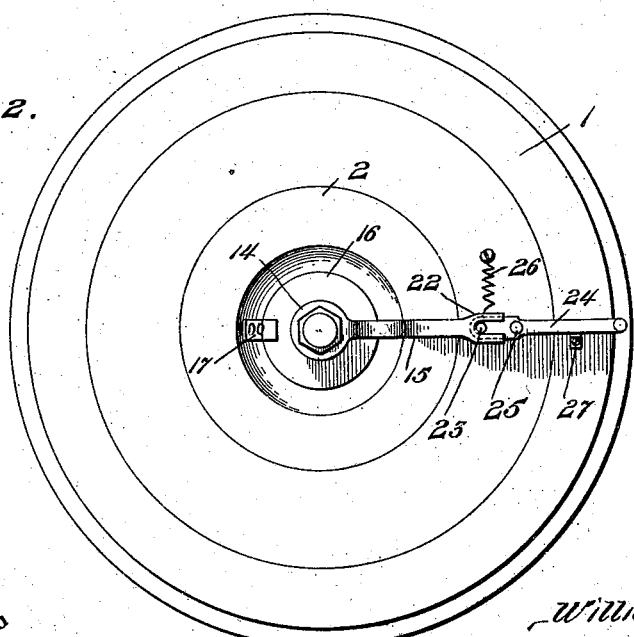
Figure 8:
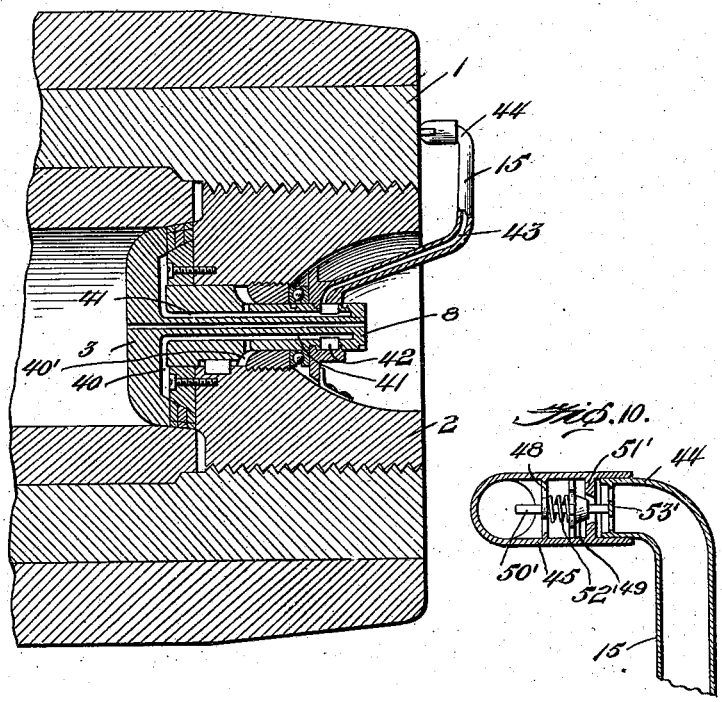
Figure 10:
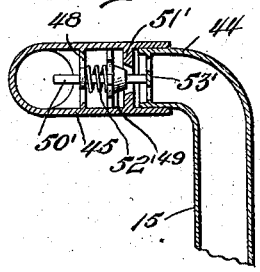
Figure 9:
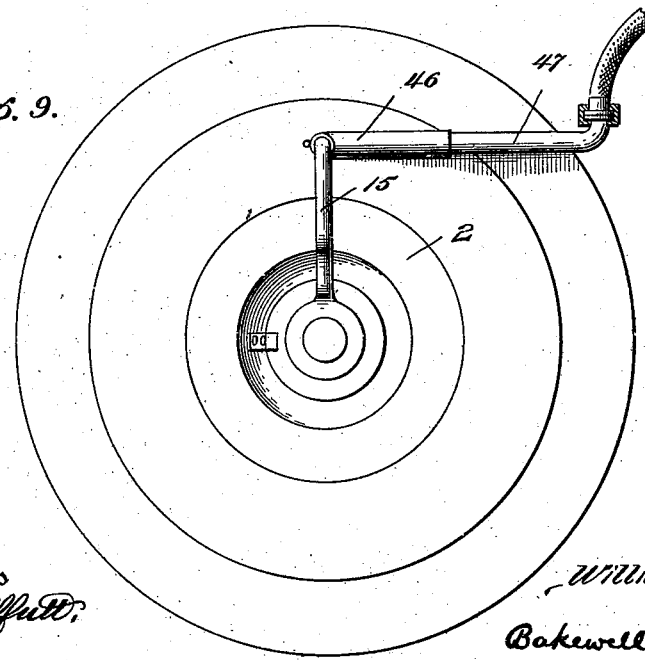

In the drawings: Figure 1 is a sectional view through the breech of a gun equipped with the improvements of my invention. Fig. 2 is a rear elevation thereof. Figs. 3, 4, 5 and 6 are detail views. Fig. 7 is a detail view illustrating a modification. Fig. 8 is a vertical section showing a modified construction. Fig. 9 is a rear elevation thereof. Fig. 10 is a detail sectional view. Fig. 11 is a plan view illustrating a modified construction. Fig. 12 is a rear elevation of the arrangement shown in Fig. 11. Fig. 13 is a vertical section of the same. Fig. 14 is a detail perspective view on an enlarged scale of the catch. Fig. 15 is a sectional view on the line 15—15 of Fig. 12. Fig. 16 is a detail view showing the rear end of the mushroom head.

Like reference numerals indicate corresponding parts in the different figures of the drawing.

The numeral 1 indicates a gun which is built up in the usual manner of a series of concentric tubes.

The numeral 2 indicates the breech block which may be of any suitable form and construction, and the numeral 3 indicates the mushroom head which may also be of any suitable form and construction.

The expansion cone 4 is interposed between the mushroom head 3 and the breech block 2 in any suitable manner, said cone being preferably secured to the forward end of the breech block 2 by screws 5, and surrounding the shank of the mushroom head, as shown clearly in Fig. 1. Loosely surrounding the expansion cone 4 between the breech block 2 and the mushroom head 3 is a plurality of split rings 6, which constitute the gas check which I prefer to use. Each of the split rings 6 preferably is constructed with beveled meeting ends, as shown in Fig. 4. It will be understood that when the mushroom head is moved rearwardly in the manner hereinafter described, the split rings 6 are expanded by the cone 4 and caused to press firmly against the inner portion of the gun, so as to prevent the rearward escape of gases. Each of the metallic rings 6 preferably is of composite construction; that is to say, each of the rings is formed of two or more metals having different properties. I prefer to form each of the rings 6 of an inner layer of some tempered metal, such, for example, as steel, and the outer layer of some soft metal, the coefficient of expansion of which is less than that of steel, such, for example, as type metal, or brass containing an alloy which will reduce its coefficient of expansion. The use of composite rings of the character described, constitutes a peculiar and important advantage of my invention, by reason of the fact that the tempered steel works readily in conjunction with the expansion cone 4 and will not become easily worn by friction, whereas the soft metal serves the two-fold function, first, of compensating for or reducing the tendency of the steel to expand when subjected to the action of heat, and second, to provide a soft surface which will readily accommodate itself to any slight irregularities in the inner portion of the gun, and which, by reason of its softness, will not wear away the adjacent metal of the gun by friction. The shank 8 of the mushroom head preferably is splined in the breech block 2 in any suitable manner, such as by means of the longitudinal groove 9 into which projects the key 10 which is suitably secured in the breech block 2. The rear portion of the shank 8 preferably is reduced in diameter and extends through a bushing 11, which preferably is screwed into the breech block 2. The reduced portion of the shank 8 is formed with screw threads, the pitch of which is very much coarser than the pitch of the usual threads of the breech block. Surrounding the threaded portion of the shank 8 is an internally threaded member 14 which preferably is formed with an integral operating lever 15. The threaded member 14 is formed with an annular flange 16, which is engaged by a lug 17 suitably secured to the breech block by means of screws or equivalent devices. Interposed between the internal threaded member 14 and the bushing 11 is a series of antifriction balls 18, which serve to permit relative rotary movement of the member 14 and breech block 2, as hereinafter set forth. The shank 8 in rear of the rotary member 14 preferably is provided with a nut 20, which engages the threaded member 14 when the mushroom head is advanced and serves to prevent accidental forward displacement of the mushroom head 3.

The outer or rear end of the operating lever 15 preferably is forked, as indicated at 22, and is adapted to straddle a pin 23, connected with a controlling lever 24 fulcrumed upon the rear end of the gun at 25. The lever 24 is normally drawn in one direction by means of a coiled spring or other suitable device 26, the movement of said lever, under the action of the spring, being limited by means, such as the stop 27.

Constructed as described, the operation of the invention is as follows: Let it be supposed that the parts are in the position illustrated in Fig. 1, wherein the mushroom head 3 is in such position as to cause the composite rings 6 to be forced backward upon the cone 4, and consequently expanded against the inner portion of the cone so as to prevent the escape of gases. When the breech block 2 is partially rotated, so as to disengage its threads from the threads of the gun breech and thus permit it to be withdrawn rearwardly in the well known manner, the controlling lever 24 by means of its pin 23 holds the operating lever 15 stationary. By reason of the fact that the mushroom head 3 rotates with the breech block 2, and further, by reason of the fact that the threaded member 14 is held stationary by the lever 15, relative movement occurs between the shank 8 and the member 14 so that the mushroom head 3 is moved in a forward direction, thus initially loosening the split rings 6 by removing the pressure therefrom. When the breech block is drawn rearwardly out of the gun, the lever 15 moves out of engagement with the pin 23. Furthermore, and this is an important advantage of the present invention, if the split composite rings 6 should still be in frictional contact with the inner portion of the gun after the mushroom head has been loosened, the rearward movement of the breech block serves to cause the expansion cone 4 to move rearwardly with relation to the split rings 6, the rearward movement of which latter is or may be slightly retarded by their engagement with the gun, until said rings 6 are engaged by the mushroom head 3 and thus moved rearwardly with the breech block. It will be seen therefore that the forward movement of the mushroom head, caused by the rotation of the breech block, serves initially to loosen the split rings 6, and the rearward movement of the breech block serves to complete the loosening of the rings. This important advantage is obtained by securing the expansion cone 4 to the breech block 2 in the manner described, instead of securing said cone to the mushroom head 3. When the breech block is replaced in the gun breech and is shoved forward, the forked end of the operating lever 15 again straddles the pin 23, so that when the breech block is partially rotated to lock it in position, the pin 23 holds the lever 15 so as to prevent it from rotating with the breech block, whereby the mushroom head 3 is automatically drawn rearwardly so as to expand the composite rings 6, and thus "set" the gas check. If the mushroom head or any other part should be slightly jammed, so that the lever 15 would have a tendency to rotate with the breech block 2, the lever 24 will be permitted to yield slightly by the spring 26, whereby any breakage of parts will be prevented. Then if the parts should remain in their slightly jammed position and it be desired to attempt to set the gas check more tightly, the lever 24 can be manually operated so as to move the lever 15 and consequently draw backward the mushroom head 3.

If desired, the levers 15 and 24 may be slightly modified, as shown in Fig. 7 by dispensing with the forked end 22 and pin 23, and providing the meeting ends of the levers 23 and 24 with ordinary toothed segments which will interlock with each other when the breech block is in its forward position. By reason of the fact that the threads on the shank 8 of the mushroom head 3, and consequently the internal threads of the member 14, are of very coarse pitch, a slight rearward movement of the mushroom head 3 by lost motion between the member 14 and the threads on the stem, caused by the recoil consequent upon the discharge, will be permitted, even though the member 14 is held stationary by the lever 15. It will be apparent therefore that the gas check thus will be initially set and tightened in a purely automatic manner by the rotation of the breech block 2, and that a further tightening of the gas check will be caused by the additional slight rearward movement of the mushroom head, due to the recoil. Furthermore, this additional tightening of the gas check by the explosion will be permitted by the spring 26, which, as before explained, permits a yielding movement of the lever 15 when the mushroom head is pushed rearwardly by the force of the explosion.

In Figs. 8, 9 and 10 of the drawing, I have illustrated a modified form of mechanism for setting the gas check and for also supplying the same with a fluid cushion, which, when the mushroom head is loosened, after the explosion, will flow into the explosion chamber of the gun and serve to clean the same as well as to expel any gases which might serve to cause a "flare back" upon the removal of the breech block. In this modified construction, the breech block, mushroom head and other coöperating parts are of the same general construction as illustrated and described with respect to Figs. 1 and 2, and the same reference numerals are used to indicate the same parts, the only difference being that the mushroom head is provided with a novel form of fluid chamber, as hereinafter described, and the lever 24 is dispensed with. The reference numeral 40 indicates an annular fluid chamber which is formed in the rear portion of the mushroom head 3 and is supplied with fluid, such, for example, as air, gas, water or the like through passages 41 which extend longitudinally through the shank 8 of the mushroom head. The passages 41 are supplied with fluid through an annular chamber 42 in communication with a passage 43 extending through the lever 15. The lever 15 is formed with a bent end 44, which, as shown in Figs. 8 and 10, is adapted, when the breech block is pushed forward, to enter the bent end 45 of a fluid supply pipe 46, which is suitably telescoped over a second fluid supply pipe 47. Slidably mounted in guides 48 in the end 45 of the pipe 46, is a conical valve 49, having a stem 50'. The valve 49 is normally pressed against its valve seat 51', by any suitable means such as the spring 52', said valve being adapted to be opened by means of a cross piece 53', which extends across the end 44 of the lever 15, the arrangement being such that when the end 44 enters the end 45, the valve 49 is opened by the cross piece 53', which abuts against the stem 50' of said valve 49.

Constructed as above described, the action of the parts is as follows: Let it be supposed that air under pressure is constantly supplied to the pipe 47 from any suitable source. When the breech block is shoved into the gun, the end 44 of the lever 15, enters the end 45 of the pipe 46, and opens the valve 49, thus permitting compressed air to pass along the lever 15 and into the annular fluid chamber 40 of the mushroom head. When the breech block is rotated, the end 45 of the pipe 46 holds the lever 15 stationary so as to tighten the mushroom head in the manner previously described. Furthermore, the telescoped joint between the pipes 46 and 47 permits a slight yielding of the lever 15 in the event that the mushroom head should be slightly jammed, for which reason it will be apparent that the telescoped joint serves the same function as the coiled spring 26 of Fig. 2. The air cushion which is formed by the compressed air in the fluid chamber 40 of the mushroom head 3 serves to take up part of the shock of the recoil. Furthermore, when the mushroom head is loosened by the rotation of the breech block in the act of removing the same, the fluid in the chamber 40 is permitted to pass out around the edge of the mushroom head and into the explosion chamber of the gun, thus forcing out of the gun any gases which may have remained therein after the explosion.

The modified construction illustrated in Figs. 11 to 16, inclusive, is designed to provide automatic means for tightening the mushroom head prior to the discharge of the gun, without making the entire operation dependent upon the rotation of the breech block; that is to say, the rotation of the breech block is merely employed to release an auxiliary mechanism, such, for example, as a spring-controlled device which rotates the mushroom head and locks it in position. Furthermore, the modified construction is designed to provide means for loosening the mushroom head upon the recoil of the gun, and for also supplying fluid to the firing chamber of the gun to clean the same before the breech block is either loosened or removed. In this modified construction, the mushroom head 3' instead of being splined in the breech block 2', is threaded through the bushing 11' in an ordinary and well known manner, as shown at 50. The expansion cone 4' is secured to the rear portion of the mushroom head by means of screws 5'. The gas check is composed of the split composite rings 6', as previously described, and is expanded by the rearward movement of the mushroom head. The lever 51 is rigidly secured to or formed integral with the shank of the mushroom head 3', so that when said lever is moved relatively to the breech block 2' in the manner hereinafter described, the mushroom head is tightened or loosened in a well known manner, according to the direction of movement of the lever 51. Mounted for rotary movement on the outer end of the lever 51 is a disk 52, which is provided with a pair of pins 53, adapted to straddle an intermediate lever 54, as shown in Fig. 15, the disk 52 being rotatably mounted on the lever 51, preferably by means of a small pin 55. The intermediate lever 54 is fulcrumed upon the gun at 56, and projects at its upper end into the path of movement of an angle lever 57, which, as shown in Fig. 11, is pivotally mounted on the rear end of the gun, as shown at 58, and projects rearwardly for a distance to engage and lock the lever 54 in the manner hereinafter described. Connected with the forward end of the lever 57 is a link 59, which is pivotally attached at its forward end to the trunnion cradle 60, as shown at 61. It will be understood that the cradle 60 is provided with suitable trunnions and loosely surrounds the gun barrel, so that when the gun is discharged, the operation of the recoil causes it to slide rearwardly in the cradle 60 in the usual and well known manner. The upper end of the intermediate lever 54 is normally drawn toward the left in Fig. 12, by means of a coiled spring 62, which is attached at one end to said lever 54, and at the other end to a lug 63, located on the gun. Pivotally mounted upon the gun at 64 is a catch 65, the upward movement of which is limited by a stop 66, and the downward movement by a stop 67. The catch 65 is formed with a notch 68, adapted to receive a pin 69, mounted upon the lever 54. The catch 65, as shown in Fig. 14, is also formed with a lateral cam portion 70, which is adapted to be engaged or wiped over by the upper pivoted end of the lever 51. The forward or pointed end of the catch 65 is normally held in depressed position by a coiled spring 71.

The operation of the above parts is as follows: The levers 51 and 54 are shown in Fig. 12 as occupying the position to which they are moved when the breech block is closed and the mushroom head is tightened preparatory to the explosion. When the discharge occurs, the recoil causes the gun to move bodily rearward, for which reason the angle lever 57 on the upper end of the gun is rocked so as to swing the lower end of the intermediate lever 54 to the left in Fig. 12. As the lower end of the lever 54 is embraced by the pins 53 on the disk 52, which is rotatably mounted on the lever 51, said lever 51 is also swung to the left into the dotted line position, whereby the mushroom head is rotated and is screwed forward in the breech block so as to loosen the gas check. When the levers 54 and 51 are thrown to the left by the action of the recoil, in the manner described, the catch 65 drops over the pin 69 and holds the lever 54 in its left hand position against the tension of the spring 62. The mushroom head having now been loosened by the recoil, the next step is to rotate the breech block and then draw the same rearwardly from the gun. In order to permit this action, the lower end of the lever 54, as shown at 54', is bent on the arc of a circle, having the shank on the mushroom head as its center, when it is in the left hand position shown by the dotted lines in Fig. 12. For this reason, when the breech block is rotated, the lever 51 swings farther to the left with the breech block, this movement being permitted by the pins 53 on the disk 52, which slide along the arc-shaped portion 54' of the lever 54. When the breech block has been entirely loosened and is drawn rearwardly, the lever 51 and disk 52 move with it, thus passing out of engagement with the arc-shaped portion 54'. When the gun has been reloaded and the breech block is replaced, the pins 53 on the disk 52 again straddle the arc-shaped portion 54' of the lever 54, so that when the breech block is rotated to lock it in position, the lever 51 is rotated therewith, whereby the upper end of said lever 51 wipes under the cam portion 70 of the catch 65 and thus raises said catch so as to cause it to release the lever 54, which is immediately drawn to the right by the action of the coiled spring 62. The lever 54 of course carries with it the lever 51, which rotates the mushroom head in the breech block and thus tightens the same.

From the foregoing it will be apparent that a partial rotation of the breech block serves to release the catch 65 which permits the spring 62 to lock the mushroom head. Furthermore, it will be apparent that after the discharge the mushroom head is unlocked or loosened by the recoil of the gun. For this reason the entire action of locking the mushroom head is not effected by the rotation of the breech block, as in the construction shown in Fig. 1, the operation of locking the mushroom head being merely started by the movement of the breech block. One advantage of this construction is that the spring 62 can only move the levers 54 and 51 far enough to tighten the mushroom head, and a nice adjustment of the parts in order to prevent breakage is unnecessary.

A further modification in Figs. 11 to 16, inclusive, relates to the means for supplying fluid to the rear end of the gun. The numeral 80 indicates a fluid supply pipe which is swiveled upon the rear end of the shank of the mushroom head in any suitable manner, and is adapted to supply compressed fluid to the grooves 81, which convey the same to the annular fluid chamber 82, which is located in front of the bushing 11' and to the fluid chamber 83 which is located in back of the expansion cone 4'. When the breech block is moved into the gun, the end of the pipe 80 enters the end of a pipe 86 and serves to open a valve therein, in the manner described with respect to Fig. 7, so as to permit compressed fluid to be supplied to the chambers 82 and 83. This compressed fluid serves to cushion the mushroom head when it is closed, as well as to flush out the firing chamber of the gun when the mushroom head is loosened by the recoil, which flushing of the gun occurs before the breech block is opened and is caused by the recoil of the gun due to the explosion.

What I claim is:

1. A gun having a gas check in the bore thereof, and means for automatically expanding the gas check when the breech block is locked; substantially as described.

2. A gun having a breech block, a gas check in the bore of the gun, and means for expanding the gas check before the discharge by the closure of the breech block; substantially as described.

3. A gun having a breech block, a metallic gas check in the bore of the gun, and means for automatically expanding the gas check by the movement of the breech block; substantially as described.

4. A gun having a breech block, a mushroom head, a metallic gas check between the breech block and the mushroom head, and means for drawing the breech block and mushroom head toward each other to expand the gas check by the closure of the breech block; substantially as described.

5. A gun having a breech block, a mushroom head, a gas check composed of a plurality of split rings interposed between the breech block and mushroom head, and means to draw the mushroom head and breech block toward each other to expand the gas check by the closure of the breech block; substantially as described.

6. A gun having a breech block, a mushroom head, a cone between the mushroom head and the breech block, a gas check surrounding the cone, and means to draw the mushroom head and breech block toward each other to force the gas check over the cone when the breech block is locked in position; substantially as described.

7. A gun having a breech block, a mushroom head, a gas check in the bore of the gun and interposed between the mushroom head and the breech block, and means to expand the gas check by the closing of the breech block; substantially as described.

8. A gun having a metallic gas check formed with an inner layer of hard tempered metal and an outer layer of soft metal the co-efficient of expansion of which is less than that of the tempered metal, the outer layer embracing the inner layer; substantially as described.

9. A gun having a metallic gas check composed of a plurality of split rings, each of said split rings having an inner layer of hard tempered metal and an outer layer of soft metal, the co-efficient of expansion of which is less than that of the tempered metal, the outer layer of each of the rings embracing the inner layer of said rings; substantially as described.

10. A gun having a gas check formed of an inner layer of steel and an outer layer of soft metal whose co-efficient of expansion is less than that of steel; substantially as described.

11. A gun having a breech block, a mushroom head, an expansion cone interposed between the mushroom head and the breech block, a gas check surrounding the cone and a connection between the breech block and the mushroom head arranged to set the gas check by the closing movement of the breech block, substantially as described.

12. A gun having a breech block, a mushroom head having a stem extending through the breech block, means to retain the mushroom head from rotation in the breech block, an expansion cone interposed between the breech block and the mushroom head, the breech block and the mushroom head being moved toward each other to expand the gas check by means of the explosion of the gun; substantially as described.

13. A gun having a breech block, a mushroom head, actuating connections between the breech block and the mushroom head, an expansible gas check between the breech block and the mushroom head, a cone arranged to expand the gas check, the gas check being initially loosened by the rotary movement of the breech block for removal and further loosened by the translating movement of the breech block; substantially as described.

14. A gun having a breech block, a mushroom head, actuating connections between the breech block and the mushroom head, a gas check between the breech block and the mushroom head, a cone arranged to expand the gas check, the gas check being expanded and contracted by the movement of the breech block; substantially as described.

15. A gun having a breech block, a gas check in the bore of the gun, a mushroom head, means for initially expanding the gas check before the explosion by the movement of the breech block and arranged to permit further expansion of the gas check under the action of the explosion; substantially as described.

16. In a gun, the combination with a breech block and a mushroom head, of a gas check, and an expansion cone secured to the forward end of the breech block for expanding and setting the gas check by the movement of the breech block; substantially as described.

17. In a gun, the combination with a breech block and a mushroom head, of a gas check, and means independent of the discharge of the gun for moving the mushroom head with relation to the breech block by the closure of the breech block to set the gas check; substantially as described.

18. In a gun, the combination with a breech block and a mushroom head, of an expansion cone, a gas check, and means for moving the mushroom head with relation to the gas check and the expansion cone by the closure of the breech block to set said check; substantially as described.

19. In a gun, the combination with a breech block, a mushroom head and a gas check, of means for moving the mushroom head for setting the gas check before the discharge of the gun by the closure of the breech block and for permitting further setting of the gas check by the discharge; substantially as described.

20. A gun having a gas check, and means for expanding the gas check prior to the discharge of the gun by the closure of the breech block, and for permitting of further expansion of the gas check by the discharge of the gun; substantially as described.

21. In a gun, a breech block, a mushroom head splined therein and having a threaded shank, an operating lever having a threaded member engaging the threaded shank of the mushroom head, a gas check interposed between the mushroom head and the breech block, and arranged to be expanded when the mushroom head is moved toward the breech block; substantially as described.

22. In a gun, a breech block, a mushroom head splined to the breech block and having a threaded shank, an expansion cone interposed between the mushroom head and the breech block, a gas check adapted to be set by the expansion cone, and an operating lever having a threaded engagement with the shank of the mushroom head; substantially as described.

23. In a gun, the combination of a breech block, a mushroom head splined in the breech block and having a threaded shank, an expansion cone secured to the end of the breech block, a gas check consisting of a plurality of split rings surrounding the expansion cone, and an operating lever having a threaded connection with the shank of the mushroom head; substantially as described.

In testimony whereof I have signed my name to this specification in the presence of two subscribing witnesses.

WILLIAM D. SMITH.

Witnesses:
C. W. FOWLER,
W. H. CRICHTON-CLARKE.